United States Patent [19]
Tomiyasu et al.

[11] Patent Number: 5,781,401
[45] Date of Patent: Jul. 14, 1998

[54] ENCAPSULATED SOLID ELECTROLYTIC CAPACITORS AND METHOD OF PRODUCING SAME

[75] Inventors: Tomohiro Tomiyasu; Yasuo Kanetake, both of Kyoto, Japan

[73] Assignee: Rohm Co., Ltd., Kyoto, Japan

[21] Appl. No.: 754,309

[22] Filed: Nov. 21, 1996

[30] Foreign Application Priority Data

Nov. 21, 1995 [JP] Japan .................................. 7-303185
Nov. 21, 1995 [JP] Japan .................................. 7303184

[51] Int. Cl.$^6$ .......................... H01G 4/005; H01G 4/00
[52] U.S. Cl. .................. 361/303; 361/301.3; 361/306.1; 361/307; 361/308.1; 361/310; 361/528; 361/538; 361/539; 29/25.03
[58] Field of Search .................... 361/303–304, 361/306.1, 306.2, 307, 308.1, 310, 301.1, 301.3, 508–509, 520, 510, 528–529, 538–539; 29/25.03

[56] References Cited

U.S. PATENT DOCUMENTS 4,510,554  4/1985  Irikura .

*Primary Examiner*—Bot L. Ledynh
*Attorney, Agent, or Firm*—Keiichi Nishimura

[57] ABSTRACT

An encapsulated solid electrolytic capacitor has an anode lead terminal, a cathode lead terminal, a capacitor element and a mold which is made of a synthetic resin material and encapsulates the capacitor element entirely. The capacitor element has an anode bar protruding longitudinally from a main body and is disposed between the anode lead terminal and the cathode lead terminal with the main body being electrically connected to the cathode lead terminal. The tip of the anode bar is welded to the anode lead terminal. The anode lead terminal has integrally formed with it a raised part which is L-shaped as seen longitudinally and is capable of having the anode bar inserted under its middle part, preventing it from becoming bent when it is soldered.

10 Claims, 5 Drawing Sheets

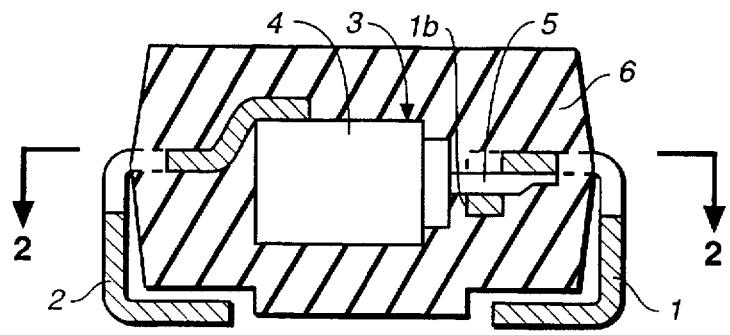
FIG._1
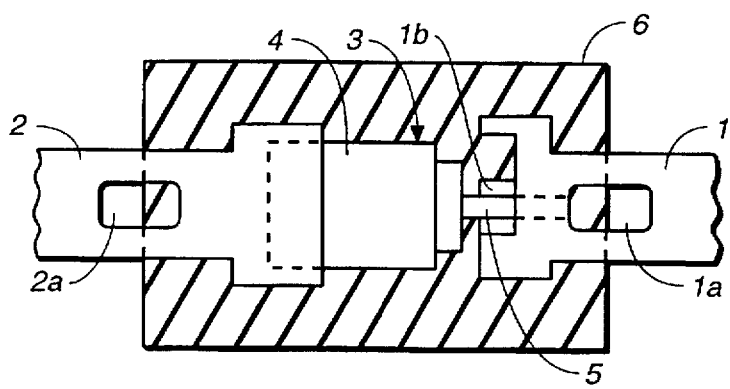
FIG._2
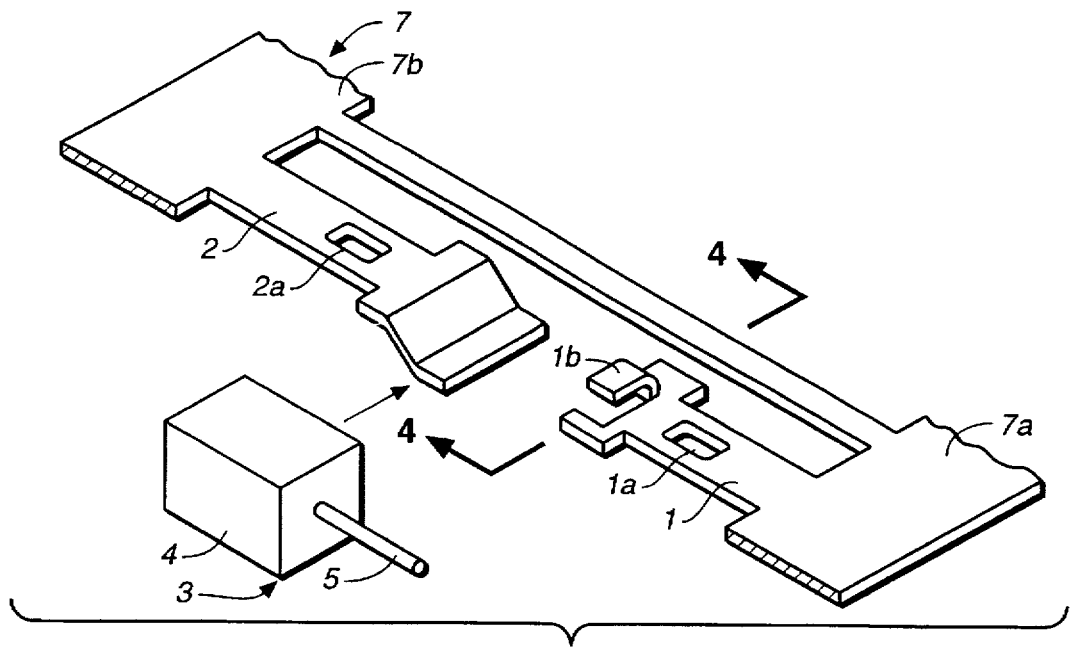
FIG._3

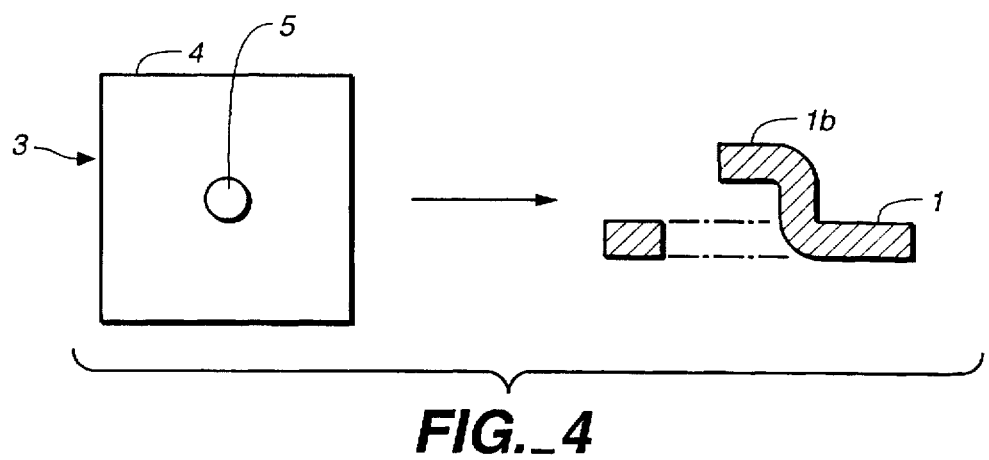
FIG._4
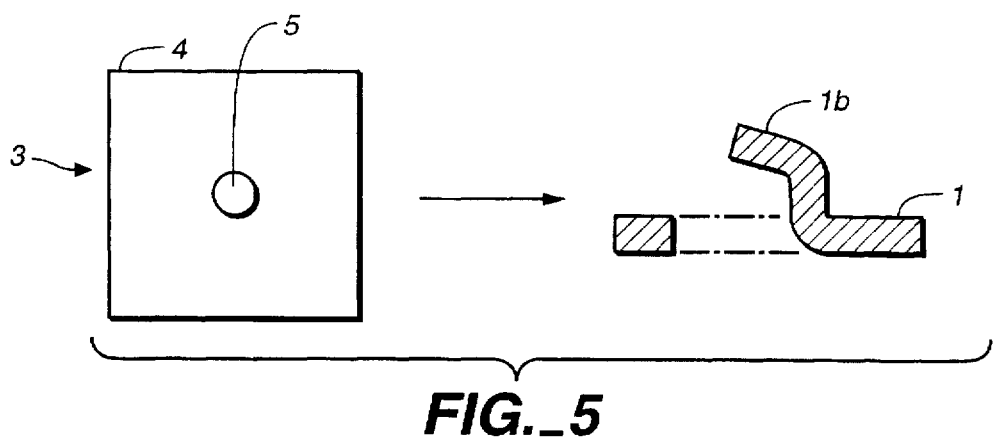
FIG._5
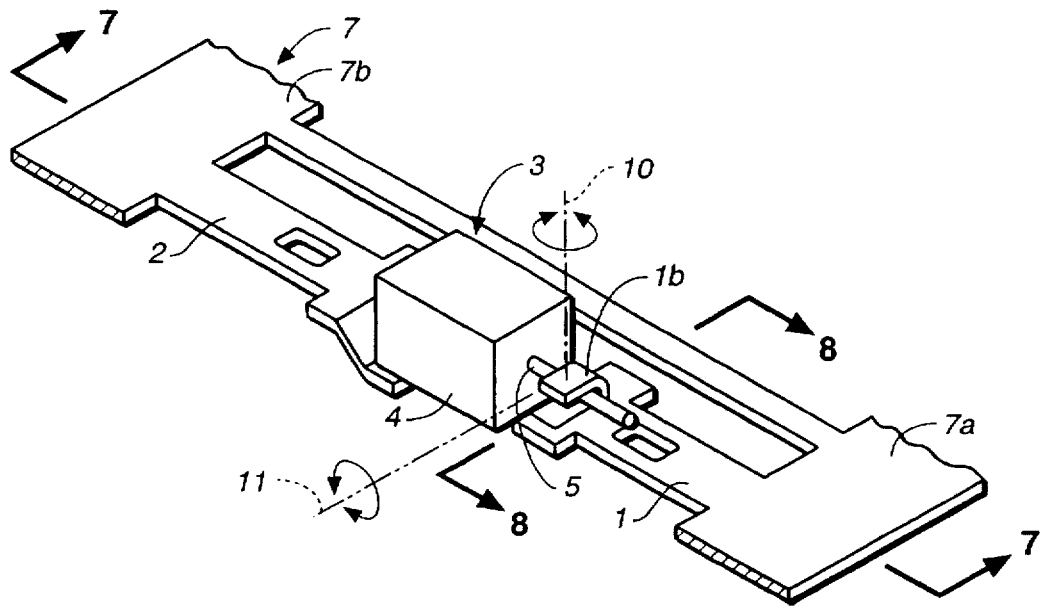
FIG._6

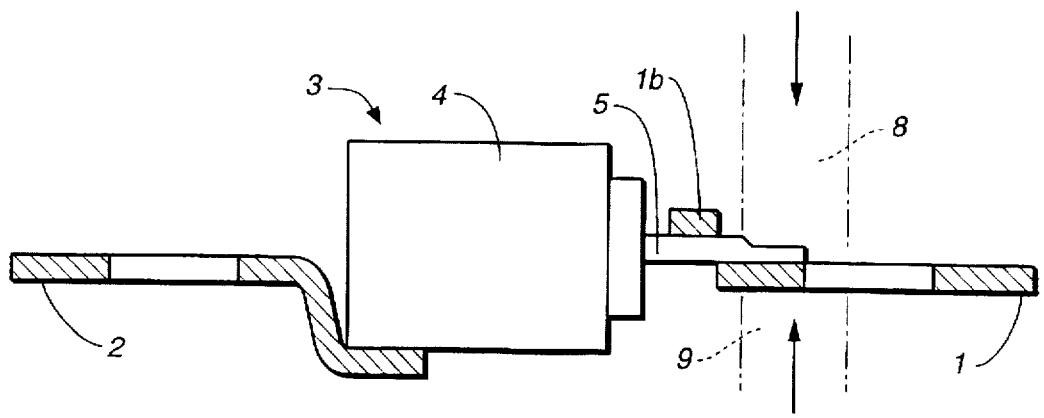
FIG._7
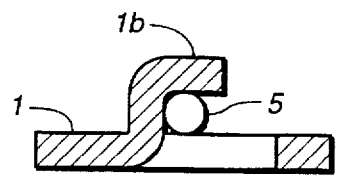
FIG._8
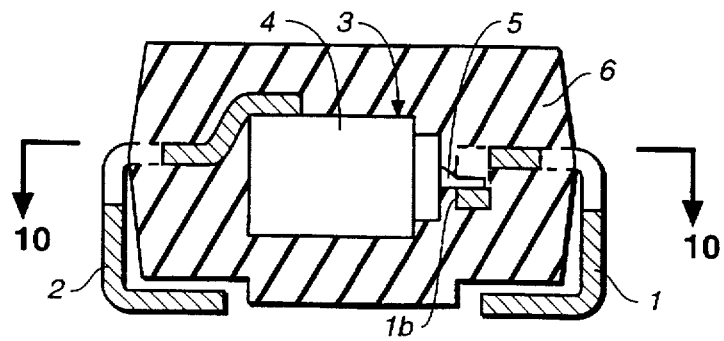
FIG._9
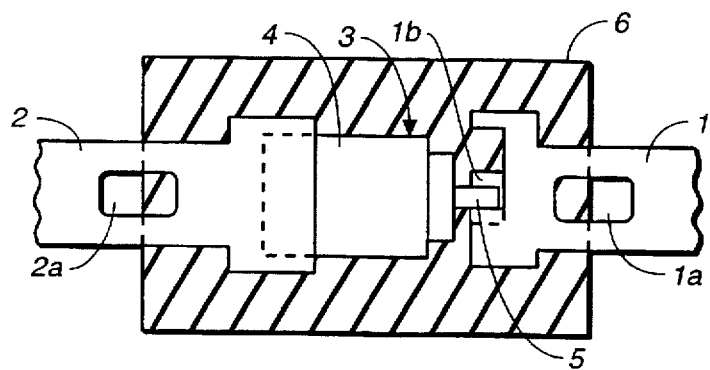
FIG._10

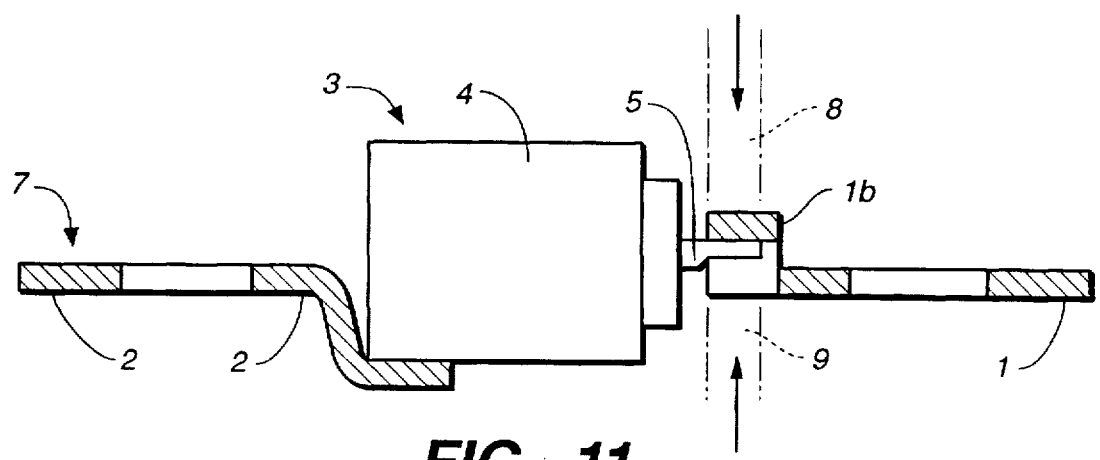
FIG._11
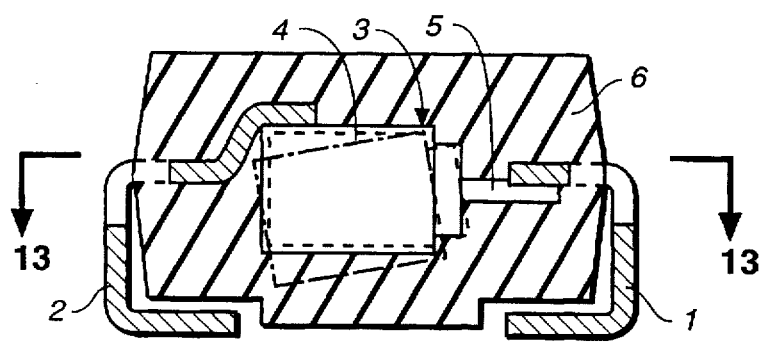
FIG._12
(PRIOR ART)
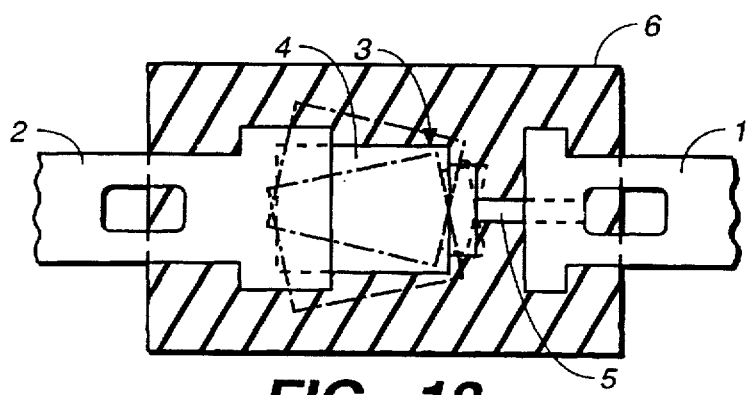
FIG._13
(PRIOR ART)

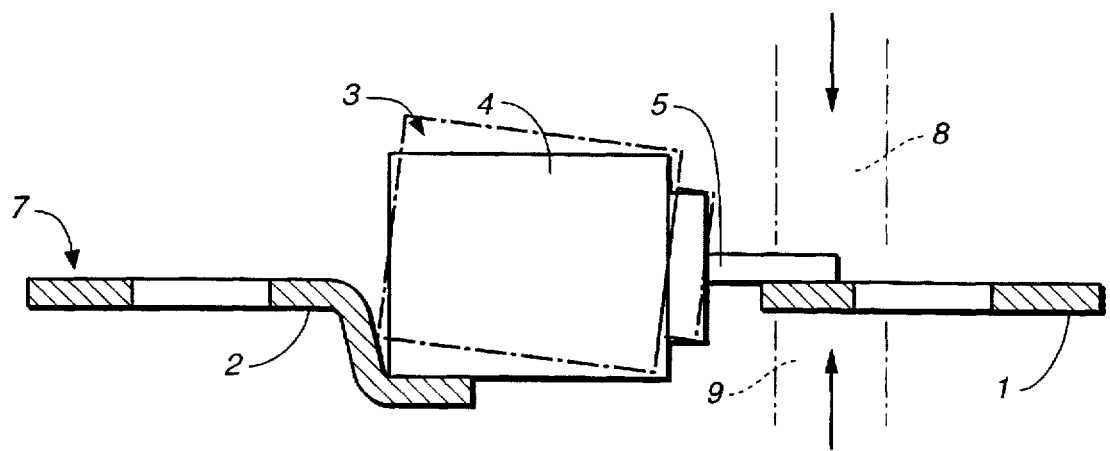
FIG._14
*(PRIOR ART)*

ENCAPSULATED SOLID ELECTROLYTIC CAPACITORS AND METHOD OF PRODUCING SAME

BACKGROUND OF THE INVENTION

This invention relates to encapsulated (or packaged-type) solid electrolytic capacitors such as tantalum and aluminum solid electrolytic capacitors having a capacitor element encapsulated inside a synthetic resin mold. This invention also relates to methods of making such encapsulated solid electrolytic capacitors.

An encapsulated solid electrolytic capacitor of this kind, as disclosed for example in Japanese Patent Publication Tokkai 6-20891 and shown in FIGS. 12 and 13, usually has an anode lead terminal 1 and a cathode lead terminal 2, both made of a metallic plate, placed opposite each other approximately on a same plane and a capacitor element 3 set between these terminals 1 and 2. The capacitor element 3 has an anode bar 5 protruding from an end surface of its main body (or a chip piece) 4 and is set such that its anode bar 5 is attached to the tip of the anode lead terminal 1, say, by spot welding and that the tip of the cathode lead terminal 2 is connected to a cathode membrane on a surface of the main body 4 either directly or through a safety fuse line against temperature and/or excess current. The combination as a whole is then encapsulated (or packaged) inside a mold 6 made of a synthetic resin material.

According to aforementioned Japanese Patent Publication Tokkai 6-20891, an encapsulated solid electric capacitor, as described above, can be produced by using a lead frame 7, made of a metallic plate and having, as shown in FIG. 14, the positive lead terminal 1 and the negative lead terminal 2 integrally formed and protruding longitudinally toward each other from a pair of side frames so as to have a specified separation between them in the longitudinal direction. As lead frames thus formed are transported longitudinally, capacitor elements 3 are deposited, as the first stage of the production process, each between a pair of positive and negative lead terminals 1 and 2 and the anode bar 5 of the capacitor element 3 is attached to the anode lead terminal 1 by spot welding by passing a current through it while it is sandwiched between a pair of electrodes 8 and 9. Subsequently, in the second stage of the production process, the main body 4 of the capacitor element 3 is connected to the cathode lead terminal 2 either directly or through a safety fuse line and, in the third stage, a mold 6 is formed by a synthetic resin material to encapsulate the whole of the capacitor element 3 and solid electrolytic capacitors are cut off from the lead frame 7.

When the anode bar 5 of the capacitor element 3, thus sandwiched between the electrodes 8 and 9, is spot-welded to the surface of the anode lead terminal 1 after the capacitor element 3 is supplied between the pair of lead terminals 1 and 2 of the lead frame 7, however, the anode bar 5 tends to become bent, causing the capacitor element 3 to move upward, as seen from the side as shown by broken lines in FIG. 14.

At the time of the spot welding, furthermore, the capacitor element 3 tends to become oriented incorrectly with respect to, or displaced from, the center line of the lead terminals 1 and 2, as shown by dotted lines in FIG. 13.

As a practical matter, such incorrect orientation and/or displacement of the capacitor element 3 cannot be corrected after its anode bar 5 is once affixed to the anode lead terminal 1 by spot welding because a stress would have to be applied to the capacitor element 3 for effecting such a correction but an application of such a stress on the capacitor element 3 can easily cause a damage to the insulative dielectric membrane on its main body 4.

If the incorrect orientation and/or displacement is significantly large, furthermore, the capacitor element 3 may fail to remain inside the encapsulating mold 6 or make portions of the mold 6 too thin.

In view of the above, a common practice has been to detect the orientation and displacement of each capacitor element 3 after it is affixed to the corresponding anode lead terminal 1 according to the method of production described above and, if the detected misorientation or displacement is greater than a specified allowable limit, to discard the defective product by cutting it off from the lead frame 7 along the lead terminals 1 and 2. This naturally affects the production yield adversely and causes an increase in the production cost.

SUMMARY OF THE INVENTION

It is therefore an object of this invention to eliminate the problems of prior art encapsulated solid electrolytic capacitors.

An encapsulated solid electrolytic capacitor embodying this invention, with which the above and other objects can be accomplished, may be characterized as comprising an anode lead terminal, a cathode lead terminal, a capacitor element and a mold which is made of a synthetic resin material and encapsulates the capacitor element entirely wherein the capacitor element has an anode bar protruding longitudinally from a main body and is disposed between the anode lead terminal and the cathode lead terminal with the main body being electrically connected to the cathode lead terminal, the anode bar having a tip part and a middle part between the tip part and the main body, the tip part of the anode bar being welded to the anode lead terminal, the anode lead terminal having integrally formed therewith a raised part which is L-shaped as seen longitudinally and is capable of having the middle part of the anode bar inserted under it. Such a capacitor can be produced by forming an anode lead terminal and a cathode lead terminal integrally with a lead frame made of a metallic plate so as to extend longitudinally opposite to each other, providing an L-shaped raised part formed integrally with and at a tip part of the anode lead terminal, providing a capacitor element having a main body and an anode bar protruding from the main body, positioning the capacitor element between the anode lead terminal and the cathode lead terminal such that the anode bar is inserted securely between the anode lead terminal and the raised part, thereafter affixing a tip part of the anode bar to the anode lead terminal by welding, thereafter electrically connecting the main body of the capacitor element to the cathode lead terminal, and thereafter encapsulating the capacitor element entirely within a mold made of a synthetic resin material.

Alternatively, the anode bar of the capacitor element may be welded to the raised part, the misorientation of the capacitor element being thereafter detected by image processing and corrected by twisting the raised part.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a sectional front view of-a solid electrolytic capacitor according to a first embodiment of this invention;

FIG. 2 is a sectional plan view of the capacitor of FIG. 1 taken along line 2—2 of FIG. 1;

FIG. 3 is a diagonal view of a lead frame which is used in a method of production embodying this invention;

FIG. 4 is a sectional view of the lead frame of FIG. 3 taken along line 4—4 of FIG. 3;

FIG. 5 is a sectional view of another lead frame which is slightly modified from that shown in FIG. 4;

FIG. 6 is a diagonal view of the lead frame of FIG. 3 with a capacitor element positioned thereon;

FIG. 7 is a sectional view taken along line 7—7 of FIG. 6;

FIG. 8 is a sectional view taken along line 8—8 of FIG. 6;

FIG. 9 is a sectional view of another solid electrolytic capacitor according to a second embodiment of this invention;

FIG. 10 is a sectional plan view of the capacitor of FIG. 9 taken along line 10—10 of FIG. 9;

FIG. 11 is a sectional view taken along line 8—8 of FIG. 6 for making a capacitor according to the second embodiment of this invention shown in FIGS. 9 and 10;

FIG. 12 is a sectional front view of a prior art solid electrolytic capacitor;

FIG. 13 is a sectional plan view of the prior art capacitor of FIG. 12 taken along line 13—13 of FIG. 12; and FIG. 14 is a sectional view of a lead frame which is used in a prior art method of production.

Throughout herein, those components which are substantially identical or at least equivalent, although they may be components of different capacitors according to different embodiments, are indicated by the same numerals for convenience.

DETAILED DESCRIPTION OF THE INVENTION

The invention is described next in detail by way of an example with reference to FIGS. 1–8, wherein components which are substantially identical or at least equivalent to those described above and shown in FIGS. 12–15 are indicated by the same numerals for convenience.

FIGS. 1 and 2 are respectively a crosssectional front view of a solid electrolytic capacitor embodying this invention and its cross-sectional plan view taken along line 2—2 of FIG. 1. To produce such solid electrolytic capacitors, use is made of a lead frame 7 of a metallic plate comprised of pairs of side frames 7a and 7b (only one pair being shown in FIG. 3) which are connected to each other and from which an anode lead terminal 1 and a cathode lead terminal 2 respectively protrude toward each other longitudinally and are separated from each other in the longitudinal direction by a specified distance. Throughholes 1a and 2a are provided to the anode and cathode lead terminals 1 and 2, respectively.

The anode lead terminal 1 according to this invention is characterized as having integrally formed therewith a raised part 1b which is sectionally L-shaped as seen in the longitudinal direction, protruding from the plane of the anode lead terminal 1 and then bent transversely to this longitudinal direction to form a tip section which is approximately parallel to the plane of the anode lead terminal 1. During a first stage in the production process while the lead frame 7 is transported in the longitudinal direction, capacitor elements 3 each with an anode bar 5 protruding from a main body 4 are supplied and deposited on the lead frame 7 individually between corresponding one of the pairs of anode and cathode lead terminals 1 and 2 as shown in FIG. 6 such that the anode bar 5 is inserted inside the sectionally L-shaped raised part 1b of the anode lead terminal 1.

This insertion is effected, as indicated by an arrow in FIG. 3, by sliding the capacitor element 3 sideways such that, as shown more clearly in FIG. 4, the anode bar 5 of the capacitor element 3 will horizontally slide into and securely under the tip section of the L-shaped raised part 1b. In order to simplify this process, the tip section of this L-shaped raised part 1b may be slightly bent upward as shown in FIG. 5 such that the entrance to the space inside the L-shaped raised part 1b becomes slightly wider.

With the anode lead terminal 1 thus structured, misorientation and displacement of the capacitor element 3 with respect to the anode lead terminal 1 can be significantly reduced in all directions.

Next, after the capacitor element 3 is thus positioned on the lead frame 7, the tip of the anode bar 5 is affixed to the anode lead terminal 1 by spot welding with electrodes 8 and 9 sandwiching them as shown in FIG. 7 and causing a current to pass therebetween. It is to be noted that the anode bar 5 is stringently prevented during this spot welding process from bending upward by being pressed down by the raised part 1b of the anode lead terminal 1, as shown in FIG. 8.

In the next stage in the production process, the cathode lead terminal 2 is connected to the main body 4 of the capacitor element 3 either directly or through a safety fuse line (not shown). The whole of the capacitor element 3 is thereafter encapsulated inside a mold 6 of a synthetic resin material and the individual capacitors are cut off from the lead frame 7. The throughholes 1a and 2a through the terminals 1 and 2 serve to prevent the terminals 1 and 2 from slipping from the mold 6.

The example described above is not intended to limit the scope of the invention. Many modifications and variations are possible within the scope of the invention. As shown in FIGS. 9 and 10, for example, the capacitor element 3 may be placed such that its anode bar 5 will contact only with the raised part 1b, the pair of electrodes 8 and 9 sandwiching them as shown in FIG. 11 for the spot welding. In the second stage of the production process according to this embodiment, the misorientation of each capacitor element 3 both in the up-down direction and the right-left direction is detected, say, by taking pictures with cameras from above and from a side and carrying out an image processing process. In the third stage of the production process, the misorientation is corrected by plastic deformation according to the result of the image processing as described above without imparting a large stress on the capacitor element 3. Explained more in detail, if the capacitor element 3 is found to be misoriented in the right-left direction with respect to the anode lead terminal 1, the plastic deformation may be effected by twisting the raised part 1b around a vertical axis 10 as shown in FIG. 6. If the capacitor element 3 is misoriented in the up-down direction with respect to the anode lead terminal 1, the raised part 1b may be twisted around a horizontal axis 11 as shown in FIG. 6 to effect the plastic deformation. After the misorientation of each capacitor element 3 is thus corrected to less than an allowable maximum limit, the main body 4 of each capacitor element 3 is connected to the corresponding cathode lead terminal 2 either directly or through a safety fuse line such as a solder wire between the tip of the cathode lead terminal 2 and the main body 4. Thereafter the whole of each capacitor element 3 is encapsulated inside a synthetic resin mold 6 as explained above with reference to the first embodiment of this invention.

In summary, the disclosure is intended to be interpreted broadly, and all such modifications and variations of the described examples that may be apparent to a person skilled in the art are intended to be within the scope of the invention.

What is claimed is:

1. An encapsulated solid electrolytic capacitor comprising:

an anode lead terminal;

a cathode lead terminal;

a capacitor element; and a mold which is made of a synthetic resin material and encapsulates said capacitor element entirely, said capacitor element having an anode bar protruding longitudinally from a main body, said capacitor element being disposed between said anode lead terminal and said cathode lead terminal, said main body being electrically connected to said cathode lead terminal, said anode bar having a tip part and a middle part between said tip part and said main body, said anode bar being welded to said anode lead terminal at said tip part, said anode lead terminal having integrally formed therewith a raised part which is L-shaped as seen longitudinally and is capable of having said anode bar inserted under said middle part.

2. The encapsulated solid electrolytic capacitor of claim 1 wherein said raised part is at a position such that said middle part alone of said anode bar is inserted thereunder when said capacity element is positioned between said anode lead terminal and said cathode lead terminal.

3. A method of producing an encapsulated solid electrolytic capacitor, said method comprising the steps of:

forming an anode lead terminal and a cathode lead terminal integrally with a lead frame made of a metallic plate so as to extend longitudinally opposite to each other;

providing an L-shaped raised part formed integrally with and at a tip part of said anode lead terminal;

providing a capacitor element having a main body and an anode bar protruding from said main body;

positioning said capacitor element between said anode lead terminal and said cathode lead terminal such that said anode bar is inserted securely between said anode lead terminal and said raised part;

thereafter affixing a tip part of said anode bar to said anode lead terminal by welding;

thereafter electrically connecting said main body of said capacitor element to said cathode lead terminal; and thereafter encapsulating said capacitor element entirely within a mold made of a synthetic resin material.

4. The method of claim 3 wherein said anode bar has a tip part and a middle part between said tip part of said anode lead terminal and said main body.

5. The method of claim 4 wherein said anode bar is positioned securely between said anode lead terminal and said raised part with only said middle part contacting said raised part.

6. An encapsulated solid electrolytic capacitor comprising:

an anode lead terminal;

a cathode lead terminal;

a capacitor element; and a mold which is made of a synthetic resin material and encapsulates said capacitor element entirely, said capacitor element having an anode bar protruding longitudinally from a main body, said capacitor element being disposed between said anode lead terminal and said cathode lead terminal, said main body being electrically connected to said cathode lead terminal, said anode lead terminal having integrally formed therewith a raised part which is L-shaped as seen longitudinally, said anode bar being welded inside said L-shaped raised part.

7. The encapsulated solid electrolytic capacitor of claim 6 wherein said anode bar contacts said anode lead terminal only through said raised part.

8. A method of producing an encapsulated solid electrolytic capacitor, said method comprising the steps of:

forming an anode lead terminal and a cathode lead terminal integrally with a lead frame made of a metallic plate so as to extend longitudinally opposite to each other;

providing an L-shaped raised part formed integrally with and at a tip part of said anode lead terminal;

providing a capacitor element having a main body and an anode bar protruding from said main body;

positioning said capacitor element between said anode lead terminal and said cathode lead terminal such that said anode bar is inserted under said raised part;

welding said anode bar to said raised part;

electrically connecting said main body of said capacitor element to said cathode lead terminal; and thereafter encapsulating said capacitor element entirely within a mold made of a synthetic resin material.

9. The method of claim 8 further comprising the steps of detecting misorientation of said capacitor element by image processing and correcting said misorientation by plastic deformation of said raised part.

10. The method of claim 8 wherein said anode bar contacts said anode lead terminal only through said raised part.

* * * * *